(12) United States Patent
Akritanakis

(10) Patent No.: US 9,380,749 B2
(45) Date of Patent: Jul. 5, 2016

(54) DRIP TAPE IRRIGATION EMITTER

(71) Applicant: Eurodrip Industrial Commercial Agricultural Societe Anonyme, Inofyta Viotias (GR)

(72) Inventor: Konstantinos Akritanakis, Inofyta Viotias (GR)

(73) Assignee: Eurodrip Industrial Commercial Agricultural Societe Anonyme, Inofyta Viotias (GR)

( * ) Notice: Subject to any disclaimer, the term of this patent is extended or adjusted under 35 U.S.C. 154(b) by 177 days.

(21) Appl. No.: 14/044,646

(22) Filed: Oct. 2, 2013

(65) Prior Publication Data

US 2015/0090816 A1  Apr. 2, 2015

(51) Int. Cl.
*A01G 25/02* (2006.01)

(52) U.S. Cl.
CPC ............ *A01G 25/023* (2013.01); *Y10T 29/494* (2015.01)

(58) Field of Classification Search
CPC .... A01G 25/02; A01G 25/023; A01G 25/026
See application file for complete search history.

(56) References Cited

U.S. PATENT DOCUMENTS

| | | | |
|---|---|---|---|
| 6,382,530 B1 * | 5/2002 | Perkins | 239/542 |
| 6,736,337 B2 | 5/2004 | Vildibill et al. | |
| 7,108,205 B1 | 9/2006 | Hashimshony et al. | |
| 7,270,280 B2 | 9/2007 | Belford | |
| 7,735,758 B2 | 6/2010 | Cohen | |
| 8,141,589 B2 | 3/2012 | Socolsky | |
| 2008/0105768 A1 | 5/2008 | Kertscher | |
| 2012/0097254 A1 | 4/2012 | Cohen | |
| 2012/0267454 A1 | 10/2012 | Einav et al. | |
| 2013/0341431 A1 * | 12/2013 | Ensworth | A01G 25/023 239/542 |

* cited by examiner

*Primary Examiner* — Darren W Gorman
(74) *Attorney, Agent, or Firm* — Nydegger & Associates

(57) ABSTRACT

An irrigation system is disclosed having a pipe and a continuous tape of irrigation emitters that is affixed to an inside surface of the pipe and extends along its length. The pipe includes a plurality of fluid outlet ports, with one output port for each emitter in the tape. Each emitter includes a base member that is affixed to the inner surface of the pipe to create an enclosed fluid flow channel between the inner surface of the pipe and the base member. For each emitter, the fluid flow channel extends from a fluid inlet port, though filtering, flow regulation and collection sections, and to one of the fluid outlet ports formed in the pipe. The flow regulation section is formed as a labyrinth path and established which reduces the deposition of particles in the emitter which can reduce flow and/or clog the emitter.

20 Claims, 3 Drawing Sheets

DRIP TAPE IRRIGATION EMITTER

FIELD OF THE INVENTION

The present invention pertains generally to devices for use in drip irrigation systems. More particularly, the present invention pertains to a continuous tape that is formed with a plurality of emitters that can be bonded to a pipe to produce a plurality of drip emitting points along the length of the pipe. The present invention is particularly, but not exclusively, useful as a continuous tape that is formed with a plurality of emitters that filter oversized particles and establish turbulent flow within the emitter to prevent emitter clogging.

BACKGROUND OF THE INVENTION

Many plants require sub-surface irrigation for effective growth and function. In particular, for large commercial operations, localized irrigation that is characterized by the administration of water in the vicinity of each plant can effectively conserve water and help prevent soil erosion due to runoff. Further, localized, low-flow irrigation over a relatively long irrigation cycle can result in deep subsurface water penetration which is beneficial for plants.

For many years, drip emitters have been used for delivering localized, low flow irrigation to the roots of plants. Generally, in use, drip emitters are placed in fluid contact with a water feed line such as a half-inch diameter irrigation line. To accomplish localized delivery of water, some drip emitters rely on the use of one or more small orifices to create a drip flow. When used, such an orifice or restriction emitter reduces the water pressure and flow rate in the irrigation line to a lower pressure and lower flow rate for the water as it passes through the orifice. Specifically, the reduced pressure and flow rate is suitable for creating a drip flow.

Heretofore, so-called 'online' type drip emitters have been operationally attached to a flexible feed line by first drilling or puncturing a series of holes in the feed line. Typically, the hole is made on the top surface of the line at the irrigation site. Next, for each hole, the barbed stem of the online type emitter can be inserted into the hole to fasten the emitter to the line and establish fluid communication between the emitter and line. On the other hand, for a so-called 'inline' type drip emitter, each inline emitter is inserted in the line at the factory, during production. A hole is then made on the top of the water outlet. In either case, these procedures can be time consuming and labor intensive. Moreover, the cost of individual emitters can be relatively expensive.

Unfortunately, simple orifice or restriction emitters often become clogged due to particulates in the feed line or debris that enters the emitter from outside the irrigation line. Although filtering can be used to reduce the presence of oversized particles, smaller particles can accumulate inside an emitter under some flow conditions causing the emitter to clog. Of course, when localized irrigation is the only source of plant water, clogging can cause loss of plant yield and in some cases result in plant death.

In some instances, the use of irrigation lines is seasonal. In these cases, the irrigation lines are typically used once and replaced. This frequent replacement of irrigation lines creates a need for relatively low cost irrigation lines.

In light of the above it is an object of the present invention to provide an irrigation system having continuous tape that is formed with a plurality of emitters that can be bonded to an inside surface of a pipe to produce a plurality of drip emitting points along the length of the pipe. It is another object of the present invention to provide a continuous tape that is formed with a plurality of emitters that filter oversized particles and establish turbulent flow within the emitter to prevent emitter clogging. It is yet another object of the present invention to provide a low cost irrigation line that is suitable for seasonal use. Yet another object of the present invention is to provide an irrigation emitter which is easy to use, relatively simple to manufacture, and comparatively cost effective.

SUMMARY OF THE INVENTION

The present invention is directed to an irrigation system that includes a pipe and a continuous tape that is welded or bonded to an inside surface of the pipe, and extends along the length of the pipe. For the system, the pipe can be hollow, cylindrically shaped and can have a plurality of fluid outlet ports that are formed through the wall of the pipe. Also for the system, the continuous tape is formed with a plurality of emitters along the length of tape, with one emitter for each fluid outlet port that is formed on the pipe.

In more structural detail, each emitter includes a base member having a filtering section, a flow regulation section and a collection section. The base member is affixed to the inner surface of the pipe to create an enclosed fluid flow channel between the inner surface of the pipe and the base member. For each emitter, the fluid flow channel extends from a fluid inlet port to one of the fluid outlet ports formed in the pipe. In addition, the base member defines a substantially straight centerline with the filtering section, the flow regulation section and the collection section sequentially aligned along the centerline of the base member.

For the present invention, the filtering section that is formed in the base member receives water that is flowing in the pipe through the fluid inlet port. Functionally, the filtering section removes oversized particles from the water before the water enters into the fluid flow channel. In one embodiment, the fluid inlet port into the filtering section includes a first plurality of vanes and a second plurality of vanes. The first plurality of vanes is mounted on the base member and positioned on one side of the centerline. Each vane in the first plurality is oriented normal to the base member centerline. Together, the vanes in the first plurality are positioned and arranged to create an open fluid flow path between adjacent vanes. With this interactive cooperation of structure, the vanes direct fluid flow toward the base member centerline and in a downstream direction through the emitter. A similar arrangement and functionality is provided by the second plurality of vanes. Specifically, the second plurality of vanes is mounted on the base member and positioned on the other side of the base member centerline, opposite the first plurality of vanes. Also, each vane in the second plurality is oriented normal to the base member centerline. Like the first plurality of vanes, the vanes in the second plurality are positioned and to create an open fluid flow path between adjacent vanes to direct fluid flow toward the base member centerline and through the emitter.

In another embodiment, the fluid inlet port into the filtering section includes vanes that are oriented orthogonal to the centerline. For this embodiment, the filtering section includes a first plurality of vanes mounted on the base member. The first plurality of vanes is positioned on one side of the centerline and each vane in the first plurality is oriented normal to the base member centerline. A similar arrangement and functionality is provided by the second plurality of vanes. Specifically, the second plurality of vanes is mounted on the base member and positioned on the other side of the base member centerline, opposite the first plurality of vanes. Also, for this embodiment, each vane in the second plurality is oriented normal to the base member centerline.

From the filtering section, water that is free from oversized particles flows along the fluid flow channel to the flow regulation section. Structurally, the flow regulation section includes a first sidewall and a second sidewall. Each sidewall is oriented substantially parallel to the base member centerline with the first sidewall spaced from the second sidewall. Also, the flow regulation section includes a first plurality of spaced apart protrusions that extend perpendicularly from the first sidewall toward the centerline, and a second plurality of spaced apart protrusions that extend perpendicularly from the second sidewall toward the centerline. For example, each protrusion can be formed as a triangular shaped tooth. In a particular embodiment, each protrusion is shaped as an isosceles triangle. To establish a labyrinth path through the flow regulation section, the first plurality of spaced apart protrusions is offset from the second plurality of spaced apart protrusions along the length of the flow regulation section (i.e. the first and second protrusions alternate along the length of the flow regulation section). As water flows through the labyrinth path, turbulent flow is established which reduces the deposition of particles in the emitter which can reduce flow and/or clog the emitter.

Also for each emitter, a collection section is formed in the base member for receiving water from the flow regulation section and for holding water prior to passing the water through an outlet port to be dripped from the pipe. Structurally, the collection section can include a pair of opposite sidewalls, with each sidewall oriented substantially parallel to the base member centerline. For the collection section, each sidewall has a first end and a second end. The first ends are separated from each other to establish an opening adjacent to the flow regulation section allowing the water to flow from the flow regulation section into the collection section. On the other hand, the second ends of the respective sidewalls are joined together to create a fluid holding chamber between the sidewalls. From the fluid holding chamber in the collection section, water flows through one of the outlet ports formed through the wall of the pipe. For example, each fluid output port can be formed as a slot in the wall of the tube that is oriented along the base member centerline.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
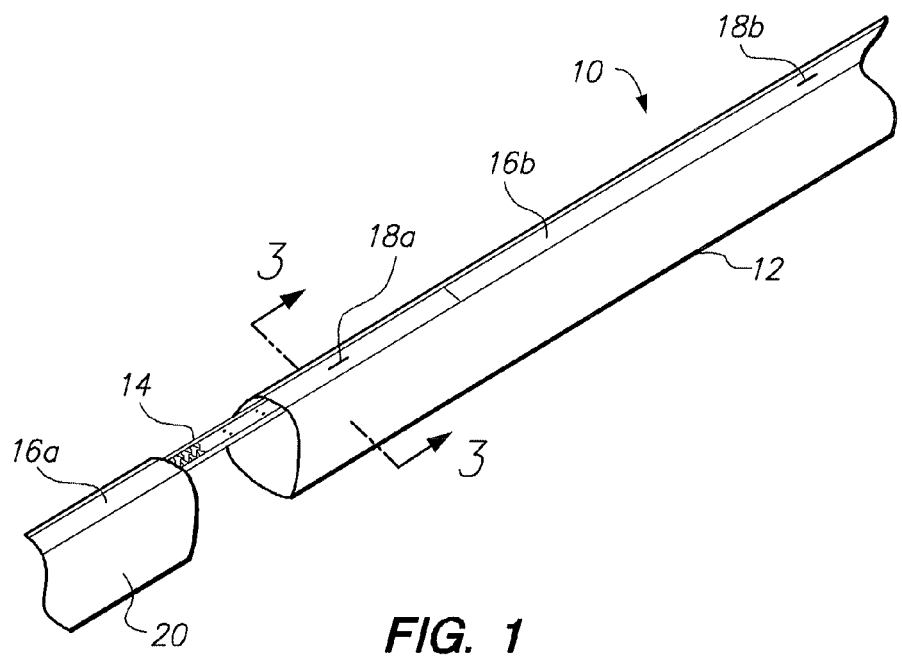
FIG. 1 is a perspective view of an irrigation system in accordance with the present invention having a pipe and a continuous tape that is formed with a plurality of emitters, shown with a portion of the pipe removed to reveal an emitter.

Referring initially to FIG. 1, an irrigation system in accordance with the present invention is shown and designated 10.

As seen in FIG. 1, the system 10 includes a pipe 12 and a continuous tape 14 which is formed with a plurality of emitters 16a,b. For example, the pipe 12 can be a standard polyethylene irrigation line that is hollow and cylindrically shaped and can have a plurality of fluid outlet ports 18a,b that are formed through the wall 20 of the pipe 12, with one emitter 16a,b for each fluid outlet port 18a,b that is formed on the pipe 12. For the system 10, the tape 14 can be made of a molded plastic, such as polyethylene plastic.

Figure 2:
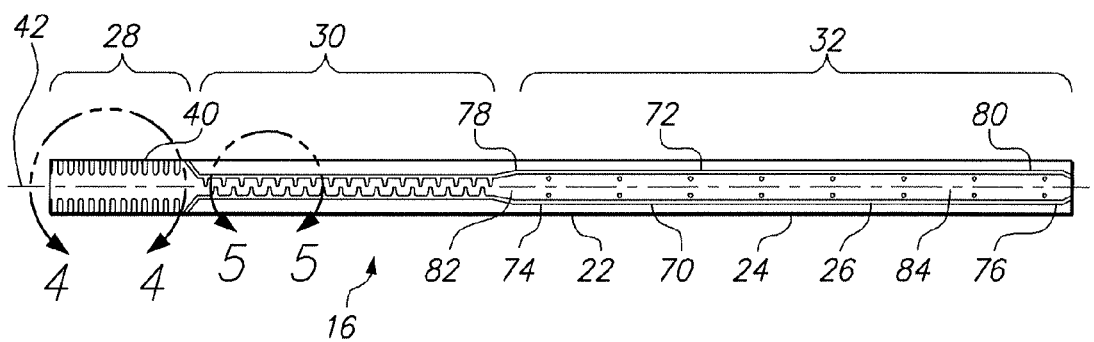
FIG. 2 is a plan view of the tape shown in FIG. 1 showing one emitter.
Figure 3:
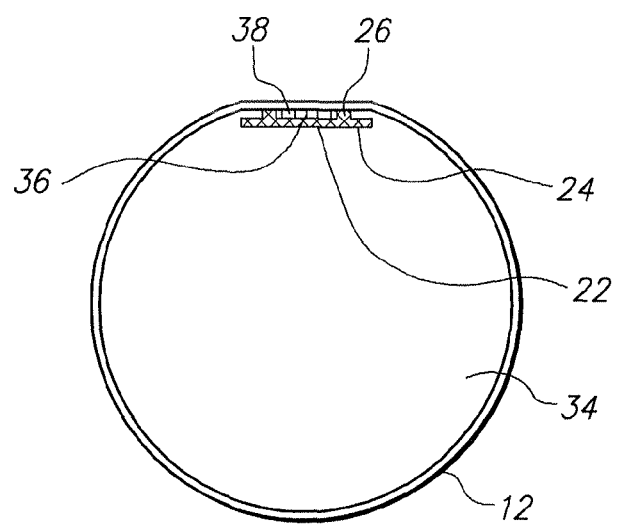
FIG. 3 is a cross-sectional view of the pipe and tape as seen along line 3-3 in FIG. 1.

As best seen in FIG. 2, each emitter 16 includes a base member 22 having a flat portion 24 together with raised features 26 that establish a filtering section 28, a flow regulation section 30 and a collection section 32. FIG. 3 shows that the base member 22 is positioned in the interior space 34 of the pipe 12 and affixed to the inside surface 36 of the pipe 12 to create an enclosed fluid flow channel 38 between the inside surface 36 of the pipe 12 and the base member 22. For example, some or all of the raised features 26 can be welded or bonded to the inside surface 36 of the pipe 12 to establish the flow channel 38.

Cross referencing FIGS. 1-3, it can be seen that for the emitter 16 a,b, the fluid flow channel 38 extends from a fluid inlet port 40 to a corresponding fluid outlet port 18b formed in the pipe. In addition, as shown in FIG. 2, the base member 22 defines a substantially straight centerline 42 with the filtering section 28, the flow regulation section 30 and the collection section 32 sequentially aligned along the centerline 42 of the base member 22.

Figure 4:
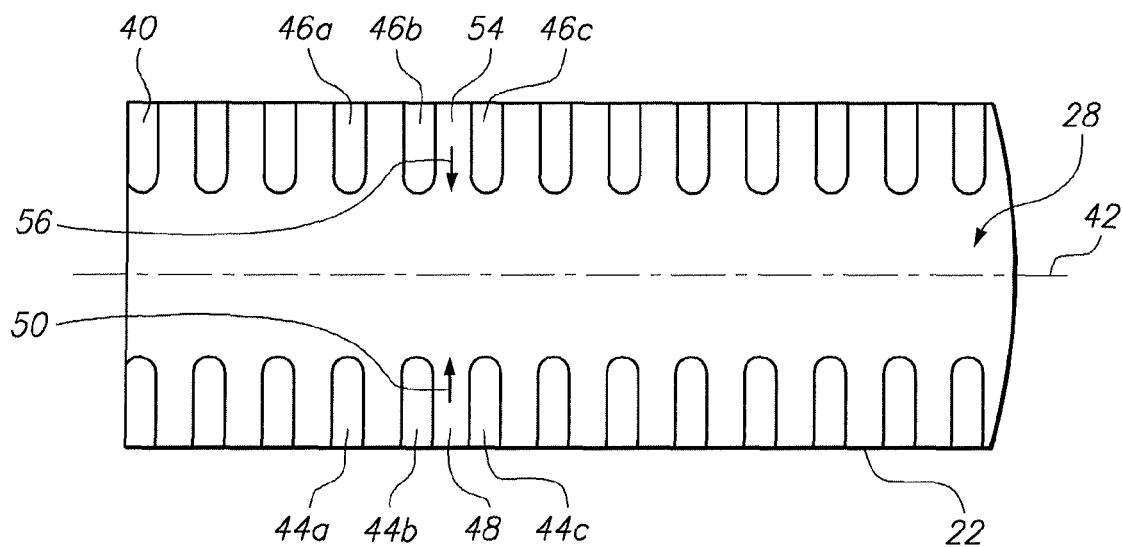
FIG. 4 is an enlarged view of a portion of an emitter filtering section as enclosed by line 4-4 in FIG. 2.

FIG. 4 illustrates an embodiment of a filtering section 28 in more detail. As seen there, the fluid inlet port 40 into the filtering section 28 includes a first plurality of vanes, of which vanes 44a-c are labeled, and a second plurality of vanes, of which vanes 46a-c are labeled. As shown, the first plurality of vanes 44a-c is mounted on the base member 22 and positioned on one side of the centerline 42. It can also be seen that each vane 44a-c is oriented normal to the base member centerline 42. Together, the vanes 44a-c are positioned and arranged to create an open fluid flow paths between adjacent vanes, such as path 48 between vane 44b and vane 44c. With this interactive cooperation of structure, the vanes 44a-c direct fluid flow in the direction of arrow 50 and toward the base member centerline 42. A similar arrangement and functionality is provided by vanes 46a-c. Specifically, the vanes 46a-c are mounted on the base member 22 and positioned on the other side of the base member centerline 42, opposite the vanes 44a-c. Also, as shown, each vane 46a-c is oriented normal to the base member centerline 42. Together, the vanes 46a-c are positioned and arranged to create an open fluid flow paths between adjacent vanes, such as path 54 between vane 46b and vane 46c. With this interactive cooperation of structure, the vanes 46a-c direct fluid flow in the direction of arrow 56 and toward the base member centerline 42. Functionally, the filtering section 28 removes oversized particles (not shown) from the water before the water enters into the fluid flow channel 38 (see FIG. 3).

Figure 5:
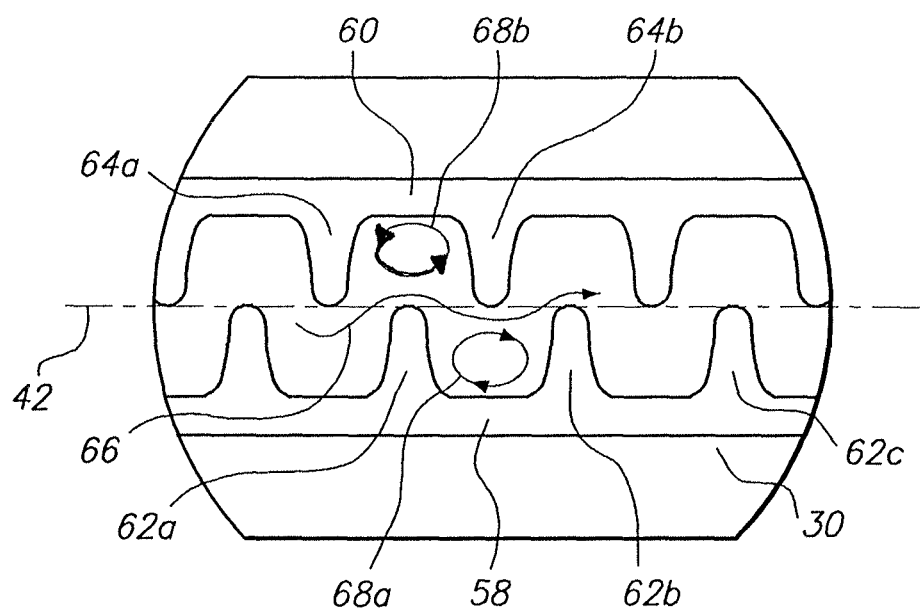
FIG. 5 is an enlarged view of a portion of an emitter flow regulation section as enclosed by line 5-5 in FIG. 2.

FIG. 5 illustrates an embodiment of a flow regulation section 30 in more detail. As shown, the flow regulation section 30 can include a first sidewall 58 and a second sidewall 60, both of which are oriented substantially parallel to the base member centerline 42. Also, as shown, the flow regulation section 30 includes a first plurality of spaced apart, rounded protrusions, of which protrusions 62a-c are labeled, that extend perpendicularly from the first sidewall 58 toward the centerline 42 and a second plurality of spaced apart, rounded protrusions, of which protrusions 64a,b are labeled, that extend perpendicularly from the second sidewall 60 toward the centerline 42. FIG. 5 illustrates that each protrusion 62a-c, 64a,b can be formed as a triangular shaped tooth. It can further be seen that the first plurality of spaced apart, rounded protrusions 62a-c is offset from the second plurality of spaced apart, rounded protrusions 64a,b along the length of the flow regulation section 30 to establish a labyrinth path 66 through the flow regulation section 30. As water flows through the labyrinth path 66, turbulent flow (indicated by flow arrows 68a,b) is established which reduces the deposition of particles which can reduce flow and/or clog the fluid flow channel 38 (shown in FIG. 3).

Referring back to FIG. 2, it can be seen that the collection section 32 can include a pair of opposite sidewalls 70, 72 that are both oriented substantially parallel to the base member centerline 42. For the collection section, the sidewall 70 has a first end 74 and a second end 76 and the sidewall 72 has a first end 78 and a second end 80. As shown, the first ends 74, 78 are separated from each other to establish an opening 82 adjacent to the flow regulation section 30 allowing the water to flow from the flow regulation section 30 into the collection section 32. On the other hand, the second ends 76, 80 of the respective sidewalls 70, 72 are joined together to create a fluid holding chamber 84 between the sidewalls 70, 72. Functionally, the collection section 32 establishes the chamber 84 to receive water from the flow regulation section 30 and for hold the water prior to passing the water through an outlet port 18a,b (see FIG. 1) to be dripped from the pipe 12.

While the particular irrigation emitter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An irrigation emitter, wherein the emitter is affixed to an inner surface of a hollow, cylindrical shaped pipe, the emitter comprising:
    a base member formed with a labyrinth, wherein the base member defines a substantially straight centerline and is affixed to the inner surface of the pipe to create an enclosed fluid flow channel between the inner surface of the pipe and the base member, with the fluid flow channel extending through the labyrinth from a fluid inlet port to a fluid outlet port;
    a filtering section formed in the base member for receiving water from the pipe through the fluid inlet port and into the fluid flow channel, with oversized particles being removed from water before entering the filtering section and wherein the fluid inlet port into the filtering section includes a first plurality of vanes mounted on the base member, positioned to one side of the centerline, and a second plurality of vanes mounted on the base member, positioned to the other side of the centerline;
    a flow regulation section formed in the base member in direct fluid communication with the filtering section for receiving water from the filtering section, wherein the flow regulation section includes a first plurality of triangular shaped protrusions spaced apart from each other to establish a space therebetween, wherein each protrusion in the first plurality extends from a first side of the base member to the centerline of the base member and is formed with a convexly rounded tip at the centerline, and a second plurality of triangular shaped protrusions spaced apart from each other to establish a space therebetween, wherein each protrusion in the second plurality extends from a second side of the base member to the centerline of the base member and is formed with a convexly rounded tip at the centerline, and wherein the first plurality and the second plurality of protrusions are offset from each other to establish a labyrinth path, wherein the labyrinth path meanders back and forth across the centerline to create eddies in spaces between successive protrusions along the respective first and second sides of the base member; and
    a collection section formed in the base member in direct fluid communication with the flow regulation section for receiving water from the flow regulation section and for holding water therein prior to passing through the outlet port to be dripped from the pipe.

2. An emitter as recited in claim 1 wherein the filtering section, the flow regulation section and the collection section are sequentially aligned along the centerline of the base member.

3. An emitter as recited in claim 2 wherein each vane in the filtering section is oriented normal to the centerline and is positioned to create an open fluid flow path between adjacent vanes to direct fluid flow toward the centerline.

4. An emitter as recited in claim 2 wherein the flow regulation section comprises two opposite sidewalls, with each sidewall oriented substantially parallel to the centerline, and wherein the protrusions alternately extend perpendicularly from a respective sidewall toward the centerline.

5. An emitter as recited in claim 4 wherein each protrusion is shaped as an isosceles triangle.

6. An emitter as recited in claim 2 wherein the pipe has a wall and the collection section comprises a pair of opposite sidewalls, with each sidewall oriented substantially parallel to the centerline, wherein each sidewall has a first end and a second end with the respective first ends thereof adjacent the flow regulation section and separated from each other to establish an opening for receiving fluid from the flow regulation section into the collection section, and wherein the second ends of the respective sidewalls are joined together to create a fluid holding chamber between the sidewalls, with the fluid outlet port being formed through the wall of the pipe in the collection section.

7. An emitter as recited in claim 6 wherein the outlet port is a slot formed through the wall of the pipe and wherein the slot is oriented along the centerline of the emitter.

8. An irrigation system comprising a hollow, cylindrical shaped pipe, and a plurality of emitters formed on a continuous tape, wherein the pipe has a wall and includes a plurality of fluid outlet ports formed through the wall, and wherein each emitter includes:
    a base member affixed to an inner surface of the pipe to create an enclosed fluid flow channel for the emitter between the inner surface of the pipe and the base member, with the fluid flow channel extending from a fluid inlet port to one of the fluid outlet ports and wherein the base member defines a substantially straight centerline;
    a filtering section formed in the base member for receiving water from the pipe through the fluid inlet port and into the fluid flow channel, with oversized particles being removed from water before entering the filtering section and wherein the fluid inlet port into the filtering section includes a first plurality of vanes mounted on the base member, positioned to one side of the centerline, and a second plurality of vanes mounted on the base member, positioned to the other side of the centerline;
    a flow regulation section formed in the base member in direct fluid communication with the filtering section for receiving water from the filtering section, wherein the flow regulation section includes a first plurality of triangular shaped protrusions spaced apart from each other to establish a space therebetween, wherein each protrusion in the first plurality extends from a first side of the base member to the centerline of the base member and is formed with a convexly rounded tip at the centerline, and a second plurality of triangular shaped protrusions spaced apart from each other to establish a space therebetween, wherein each protrusion in the second plurality extends from a second side of the base member to the centerline of the base member and is formed with a convexly rounded tip at the centerline, and wherein the first plurality and the second plurality of protrusions are offset from each other to establish a labyrinth path, wherein the labyrinth path meanders back and forth across the centerline to create eddies in spaces between successive protrusions along the respective first and second sides of the base member; and a collection section formed in the base member in direct fluid communication with the flow regulation section for receiving water from the flow regulation section and for holding water therein prior to passing through one of the outlet ports.

9. A system as recited in claim 8 wherein the filtering section, the flow regulation section and the collection section are sequentially aligned along the centerline of the base member.

10. A system as recited in claim 9 wherein each vane in the filtering section is oriented normal to the centerline and is positioned to create an open fluid flow path between adjacent vanes to direct fluid flow toward the centerline.

11. A system as recited in claim 9 wherein for each emitter the flow regulation section comprises two opposite sidewalls, with each sidewall oriented substantially parallel to the centerline, and wherein the protrusions alternately extend perpendicularly from a respective sidewall toward the centerline.

12. A system as recited in claim 11 wherein each protrusion is shaped as an isosceles triangle.

13. A system as recited in claim 9 wherein for each emitter the collection section comprises a pair of opposite sidewalls, with each sidewall oriented substantially parallel to the centerline, wherein each sidewall has a first end and a second end with the respective first ends thereof adjacent the flow regulation section and separated from each other to establish an opening for receiving fluid from the flow regulation section into the collection section, and wherein the second ends of the respective sidewalls are joined together to create a fluid holding chamber between the sidewalls, with the fluid outlet port for the emitter being formed through the wall of the pipe in the collection section.

14. A system as recited in claim 13 wherein each fluid outlet port is a respective slot formed through the wall of the pipe and oriented along the centerline of the emitter.

15. A method of manufacturing an irrigation system comprising the steps of:

forming a plurality of fluid outlet ports in a wall of a hollow, cylindrical shaped pipe; and affixing a continuous tape to an inner surface of the pipe, the continuous tape having a plurality of emitters formed thereon with one emitter for each fluid outlet port, and wherein each emitter includes; a base member affixed to the inner surface of the pipe to create an enclosed fluid flow channel for the emitter between the inner surface of the pipe and the base member, with the fluid flow channel extending from a fluid inlet port to one of the fluid outlet ports and wherein the base member defines a substantially straight centerline; a filtering section formed in the base member for receiving water from the pipe through the fluid inlet port and into the fluid flow channel, with oversized particles being removed from water before entering the filtering section and wherein the fluid inlet port into the filtering section includes a first plurality of vanes mounted on the base member, positioned to one side of the centerline, and a second plurality of vanes mounted on the base member, positioned to the other side of the centerline; a flow regulation section formed in the base member in direct fluid communication with the filtering section for receiving water from the filtering section, wherein the flow regulation section includes a first plurality of triangular shaped protrusions spaced apart from each other to establish a space therebetween, wherein each protrusion in the first plurality extends from a first side of the base member to the centerline of the base member and is formed with a convexly rounded tip at the centerline, and a second plurality of triangular shaped protrusions spaced apart from each other to establish a space therebetween, wherein each protrusion in the second plurality extends from a second side of the base member to the centerline of the base member and is formed with a convexly rounded tip at the centerline, and wherein the first plurality and the second plurality of protrusions are offset from each other to establish a labyrinth path, wherein the labyrinth path meanders back and forth across the centerline to create eddies in spaces between successive protrusions along the respective first and second sides of the base member; and a collection section formed in the base member in direct fluid communication with the flow regulation section for receiving water from the flow regulation section and for holding water therein prior to passing through one of the outlet ports.

16. A method as recited in claim 15 wherein the filtering section, the flow regulation section and the collection section are sequentially aligned along the centerline of the base member.

17. A method as recited in claim 16 wherein each vane in the filtering section is oriented normal to the centerline and is positioned to create an open fluid flow path between adjacent vanes to direct fluid flow toward the centerline.

18. A method as recited in claim 16 wherein for each emitter the flow regulation section comprises two opposite sidewalls, with each sidewall oriented substantially parallel to the centerline, and wherein the protrusions alternately extend perpendicularly from a respective sidewall toward the centerline.

19. A method as recited in claim 16 wherein for each emitter the collection section comprises a pair of opposite sidewalls, with each sidewall oriented substantially parallel to the centerline, wherein each sidewall has a first end and a second end with the respective first ends thereof adjacent the flow regulation section and separated from each other to establish an opening for receiving fluid from the flow regulation section into the collection section, and wherein the second ends of the respective sidewalls are joined together to create a fluid holding chamber between the sidewalls, with the fluid outlet port for the emitter being formed through the wall of the pipe in the collection section.

20. A method as recited in claim 19 wherein each fluid outlet port is a respective slot formed through the wall of the pipe and oriented along the centerline of the emitter.

* * * * *